US011079243B2

(12) United States Patent
Dashti et al.

(10) Patent No.: US 11,079,243 B2
(45) Date of Patent: Aug. 3, 2021

(54) CONTINUOUS DELIVERY

(71) Applicant: Accenture Global Solutions Limited, Dublin (IE)

(72) Inventors: Marzieh Dashti, Dublin (IE); Carlos Miguel Garcia Mejias, Dublin (IE); Henry Frederick Cartwright, London (GB); Konstantinos Mammas, Dublin (IE); Shane O. Meachair, Dublin (IE); Daniel Gradovich, Dublin (IE); David E. Hubbard, Johns Creek, GA (US)

(73) Assignee: Accenture Global Solutions Limited, Dublin (IE)

( * ) Notice: Subject to any disclaimer, the term of this patent is extended or adjusted under 35 U.S.C. 154(b) by 369 days.

(21) Appl. No.: 16/228,908

(22) Filed: Dec. 21, 2018

(65) Prior Publication Data

US 2020/0116508 A1 Apr. 16, 2020

(30) Foreign Application Priority Data

Oct. 15, 2018 (EP) .................................. 18386030

(51) Int. Cl.
*G01C 21/34* (2006.01)
*G06Q 10/08* (2012.01)

(52) U.S. Cl.
CPC ..... *G01C 21/3415* (2013.01); *G01C 21/3484* (2013.01); *G01C 21/3492* (2013.01); *G06Q 10/0838* (2013.01); *G06Q 10/08355* (2013.01)

(58) Field of Classification Search
CPC ............ G01C 21/3415; G01C 21/3484; G01C 21/3492; G06Q 10/08355; G06Q 10/0838;

(Continued)

(56) References Cited

U.S. PATENT DOCUMENTS

| 8,170,915 B2 | 5/2012 | Borders et al. |
| 8,554,458 B2 | 10/2013 | Sawhill et al. |
| 9,569,745 B1 * | 2/2017 | Ananthanarayanan ..................... G06Q 10/087 |

(Continued)

FOREIGN PATENT DOCUMENTS

| CA | 3021069 | 10/2017 |
| JP | 2002-169948 | 6/2002 |

(Continued)

OTHER PUBLICATIONS

Australian Office Action in Australian Appln. No. 2019236636, dated Apr. 19, 2020, 6 pages.

(Continued)

*Primary Examiner* — Muhammad Shafi
(74) *Attorney, Agent, or Firm* — Fish & Richardson P.C.

(57) ABSTRACT

Implementations include determining a set of routes for delivery of assets within a delivery network based on realized and forecasted demand for a period, during at least partial execution of the set of routes, receiving real-time data representative of delivery of assets, and updated demand forecasts, determining, by an optimization controller, a time-to-trigger, and a cut-off time, and an updated demand forecast, the time-to-trigger defining an interval, at which the set of routes for delivery of assets is to be reoptimized, in response to the time-to-trigger being achieved, re-optimizing, by a route optimization module of the continuous delivery platform, the set of routes to provide a revised set of routes, and conveying at least one route of the revised set of routes to a delivery personnel, the at least one route being different from any route in the set of routes, and being executed during the period.

36 Claims, 5 Drawing Sheets

(58) Field of Classification Search
CPC ........... G06Q 10/06312; G06Q 10/083; G06Q 10/047
USPC .......................................................... 701/411
See application file for complete search history.

(56) References Cited

U.S. PATENT DOCUMENTS

| | | | | |
|---|---|---|---|---|
| 9,631,938 | B2* | 4/2017 | Axelrod | G06Q 10/047 |
| 2008/0275643 | A1* | 11/2008 | Yaqub | G01C 21/343 |
| | | | | 701/412 |
| 2010/0057341 | A1* | 3/2010 | Bradburn | G01C 21/3415 |
| | | | | 701/533 |
| 2017/0323249 | A1* | 11/2017 | Khasis | G01C 21/3469 |

FOREIGN PATENT DOCUMENTS

| | | |
|---|---|---|
| JP | 2015-201006 | 11/2015 |
| JP | 2017-154883 | 9/2017 |
| KR | 10-2015-0131742 | 11/2015 |

OTHER PUBLICATIONS

European Search Report and Written Opinion in European Appln No. 18386030.3, dated Feb. 11, 2019, 5 pages.
JP Decision to Grant Patent in Japanese Appln. No. 2019-187747, dated Dec. 15, 2020, 6 pages (with English translation).
IN Office Action in Indian Appln. No. 201914038744, dated May 5, 2021, 6 pages.

* cited by examiner

CONTINUOUS DELIVERY

CROSS-REFERENCE TO RELATED APPLICATION

This application claims priority to European Patent Application No. 18386030.3, filed on Oct. 15, 2018, entitled "Continuous Delivery," the entirety of which is hereby incorporated by reference.

BACKGROUND

Online shopping, also referred to as eCommerce, has significantly advanced. However, there is a market disconnect in eCommerce between consumer and retail expectations, and traditional delivery services. For example, consumers have evolved, and demand cheaper and faster delivery of goods, while expecting greater control over the method and timing of the delivery. Traditional post and parcel delivery models do not offer a compelling proposition, and are currently unable to leverage their networks to provide fast and flexible deliveries at scale. So called Last Mile Delivery (LVID) services have proven to be fast and scalable, but are currently unable to reach a sustainability. In addition, the current delivery models, traditional and new, do not offer a compelling customer experience. Retailers suffer most from this disconnect. Low brand loyalty means that when a consumer has a poor delivery experience they are unlikely to shop with that retailer again. Consequently, retailers bear the fallout from a poor delivery service that they do not control. LVID has therefore become a key differentiator for customer and brand loyalty.

SUMMARY

Implementations of the present disclosure are generally directed to continuous delivery. More particularly, implementations of the present disclosure are directed to a continuous delivery platform that selectively reoptimizes routes during a period to drive efficiencies across cost, time, and resources.

In some implementations, actions include determining a set of routes for delivery of assets within a delivery network based realized and forecasted demand for a period, during at least partial execution of the set of routes, receiving real-time data representative of delivery of assets, and updated demand forecasts, determining, by an optimization controller of the continuous delivery platform, one or more of a time-to-trigger, and a cut-off time at least partially based on the real-time data, and an updated demand forecast, the time-to-trigger defining an interval, at which the set of routes for delivery of assets is to be reoptimized, in response to the time-to-trigger being achieved, re-optimizing, by a route optimization module of the continuous delivery platform, the set of routes to provide a revised set of routes, and conveying at least one route of the revised set of routes to a delivery personnel, the at least one route being different from any route in the set of routes, and being executed during the period. Other implementations of this aspect include corresponding systems, apparatus, and computer programs, configured to perform the actions of the methods, encoded on computer storage devices.

These and other implementations can each optionally include one or more of the following features: routes defined as a plurality of dynamic nodes, at least one node changing between a route in the set of routes, and a route in the revised set of routes; the time-to-trigger is intermittently updated during the period, and at least one subsequent re-optimization of routes is executed based on an updated time-to-trigger; the time-to-trigger is at least partially determined by on incremental learning based on the demand forecast, and actual conditions within the delivery network; the incremental learning at least partially includes one of retraining a predictive model based on a most-recent dataset available, and retraining the predictive model based on a full dataset including historical data, and the most-recent dataset; at least a portion of the real-time data is received from a mobile computing device of the deliver personnel, and the at least one route of the revised set of routes is conveyed to the mobile computing device; the cut-off time defines a time during the period, after which re-optimization of the routes is not executed; the at least one route includes one of a new route, and a modified route; the set of routes is determined based on historical asset demand data; determining the set of routes includes predicting one or more route destinations; the real-time data is representative of a location of a delivery vehicle and/or of a location of an asset; and actions further include optimizing a time for delivery of an asset on one or more routes of the set of routes.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
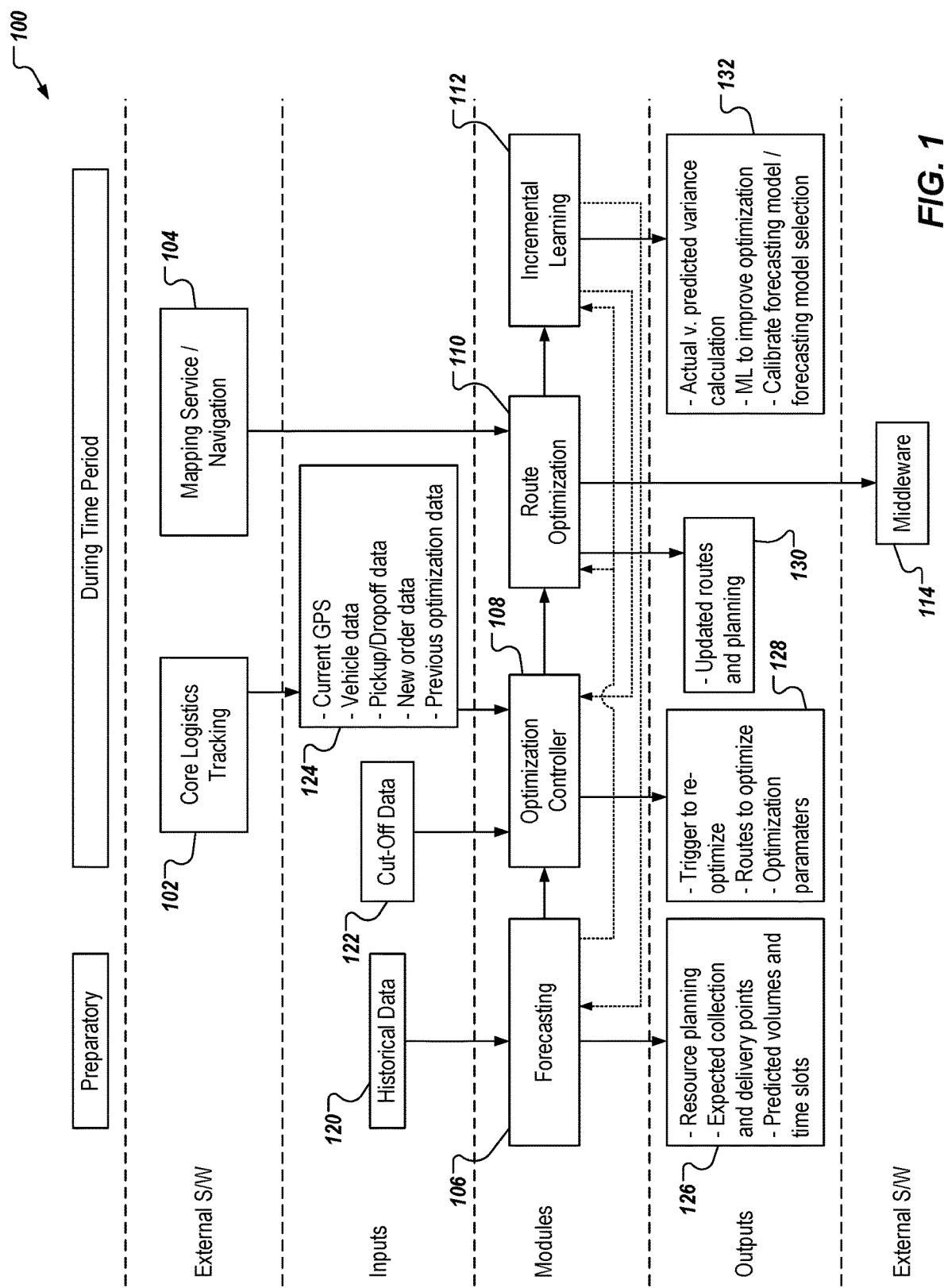
FIG. 1 depicts an example conceptual architecture in accordance with implementations of the present disclosure.

Implementations of the present disclosure are generally directed to delivery of assets (e.g., physical assets). More particularly, implementations of the present disclosure are directed to a continuous delivery platform that selectively reoptimizes routes during a period to drive efficiencies across cost, time, and resources. In some implementations, actions include determining a set of routes for delivery of assets within a delivery network based realized and forecasted demand for a period, during at least partial execution of the set of routes, receiving real-time data representative of delivery of assets, and updated demand forecasts, determining, by an optimization controller of the continuous delivery platform, one or more of a time-to-trigger, and a cut-off time at least partially based on the real-time data, and an updated demand forecast, the time-to-trigger defining an interval, at which the set of routes for delivery of assets is to be reoptimized, in response to the time-to-trigger being achieved, re-optimizing, by a route optimization module of the continuous delivery platform, the set of routes to provide a revised set of routes, and conveying at least one route of the revised set of routes to a delivery personnel, the at least one route being different from any route in the set of routes, and being executed during the period.

As described in further detail herein, implementations of the present disclosure are directed to a continuous delivery platform that provides Same Day Delivery (SDM), and Last Mile Delivery (LDM) solutions to meet evolved consumer expectations, and satisfy retailer requirements. Implementations of the present disclosure introduces a continuous delivery model for orchestration of delivery and logistics networks (e.g., in urban environments). In some examples, the continuous delivery platform of the present disclosure achieves greater efficiency, and cost savings for asset delivery. However, implementations of the present disclosure have broad application across postal, Courier Express Parcel (CEP), retail, consumer goods and services (CGS), and other industries. As described in further detail herein, the continuous delivery platform utilizes predictive analytics and machine learning to create a flexible delivery framework that combines the scale and reliability of traditional delivery methods with the flexibility and dynamism of new models in a way that meets customer expectations while remaining cost effective.

Although implementations of the present disclosure are described with reference to one or more use cases, it is contemplated that implementations of the present disclosure can be applicable in any appropriate use case. An example use case includes orchestration of postal delivery networks to enable injection of delivery volume into existing static carrier fleets by dynamic fleets to enable same day delivery in urban environments. Another example use case includes provision of an intelligent delivery ecosystem for a retailer with multiple delivery fleets to drive utilisation across their networks. Another example user case includes orchestration of deliveries within a city with a focus on reduced congestion and emissions through the consolidation of parcels across fleets and available networks. Another example use case includes orchestration of separate delivery and service networks on behalf of retailers to match arrival of goods with arrival of service (e.g. delivery of a TV to arrive at the same time as installation support). Another example use case includes intelligent stock replenishment of business-to-business (B2B) spare part replenishment through a highly flexible and responsive delivery ecosystem. Another example use case includes consolidation of parcels across a locale (e.g., city) to drive delivery cost efficiencies for retailers. Another example use case includes intelligent capacity management of carriers through understanding predictive demand and fleet utilisation. Another example use case includes dynamic pricing to pass real-time pricing details to retailers for customer delivery promotions.

Implementations of the present disclosure are described herein with reference to one or more terms. For example, a cut-off threshold can be described as a point during a period (e.g., day), at which new orders are no longer accepted for delivery to meet a certain time or cost SLAs. As another example, a carrier can be described as a provider of a delivery services (e.g., postal service, courier service). As another example, continuous delivery refers to the act of continually optimizing the delivery ecosystem throughout the period (e.g., day) to attempt to optimize efficiencies. As another example, route optimization can be described as an activity to determine the best route between a series of points depending on the variable to control for (e.g. speed, cost, congestion, capacity). As another example, demand forecasting can be described as an activity to predict the likely demand for delivery services within a given area and time. As another example, optimization controller can be described as a technology to know when the best time is, given a specified variable, and/or combination of variables, to run a route optimization process. As another example, incremental learning can include, without limitation, reinforcement learning to understand the positive and negative attributes of past activities, and inform future decision making. In some examples, real-time can describe actions that can be automatically executed (e.g., using one or more computer-executable programs) without requiring human input and without any intentional delay, taking into account the processing limitations of the continuous delivery platform executing the actions and any time required to process data, for example.

As described in further detail herein, the continuous delivery platform of the present disclosure utilize predictive analytics, machine learning (ML), and artificial intelligence (AI) for dynamic route optimization. More particularly, the continuous delivery platform provides time-efficient route optimization. In some examples, an actual demand for the day is fed into a route optimization tool, which produces an initial master plan of routes for the day. Throughout the day, a core logistic tracking system tracks driver information (e.g., GPS location, package pickup, delivery information). In some examples, real-time route information is fed back into an optimization controller. If an optimization is to be executed, route optimization is triggered and a new route is calculated. The new route drives events that are published to the driver. In some examples, a route is changed because a driver is behind/ahead of schedule, and/or a new activity identified.

In some implementations, the continuous delivery platform includes analytics components. Example analytics components include, without limitation, route optimization, demand forecasting, an optimization controller, and incremental learning. In some examples, route optimization is used to optimize and re-optimize routes based on driver location, real-time status and traffic information, collections and deliveries. In some examples, demand forecasting is used to forecast expected collections and deliveries for each geography and timeframe. In some examples, the optimization controller is used to determine when to launch route optimization and re-optimization based on historical and real-time factors. In some examples, incremental learning is used to help demand forecasting and optimization controller learn from the difference between expected and realized events.

FIG. 1 depicts an example conceptual architecture 100 in accordance with implementations of the present disclosure.

The example conceptual architecture 100 of FIG. 1 includes an external software layer, an inputs layer, a modules layer, an outputs layer, and an external software layer. The external software layer includes core logistics and tracking software 102, and mapping service/navigation software 104. The inputs layer includes historical data 120, cut-off data 122, and logistics and tracking data 124. The modules layer includes a forecasting module 106, an optimization controller module 108, a route optimization module 110, and an incremental learning module 112. The outputs layer includes forecasting data 126, optimization data 128, updated routing data 130, and feedback data 132. The external software layer includes middleware 114.

To support the analytics and ML components described herein, several software components are incorporated. The software components are responsible for handling external entry points, storage, and internal communications and services orchestration.

Figure 2:
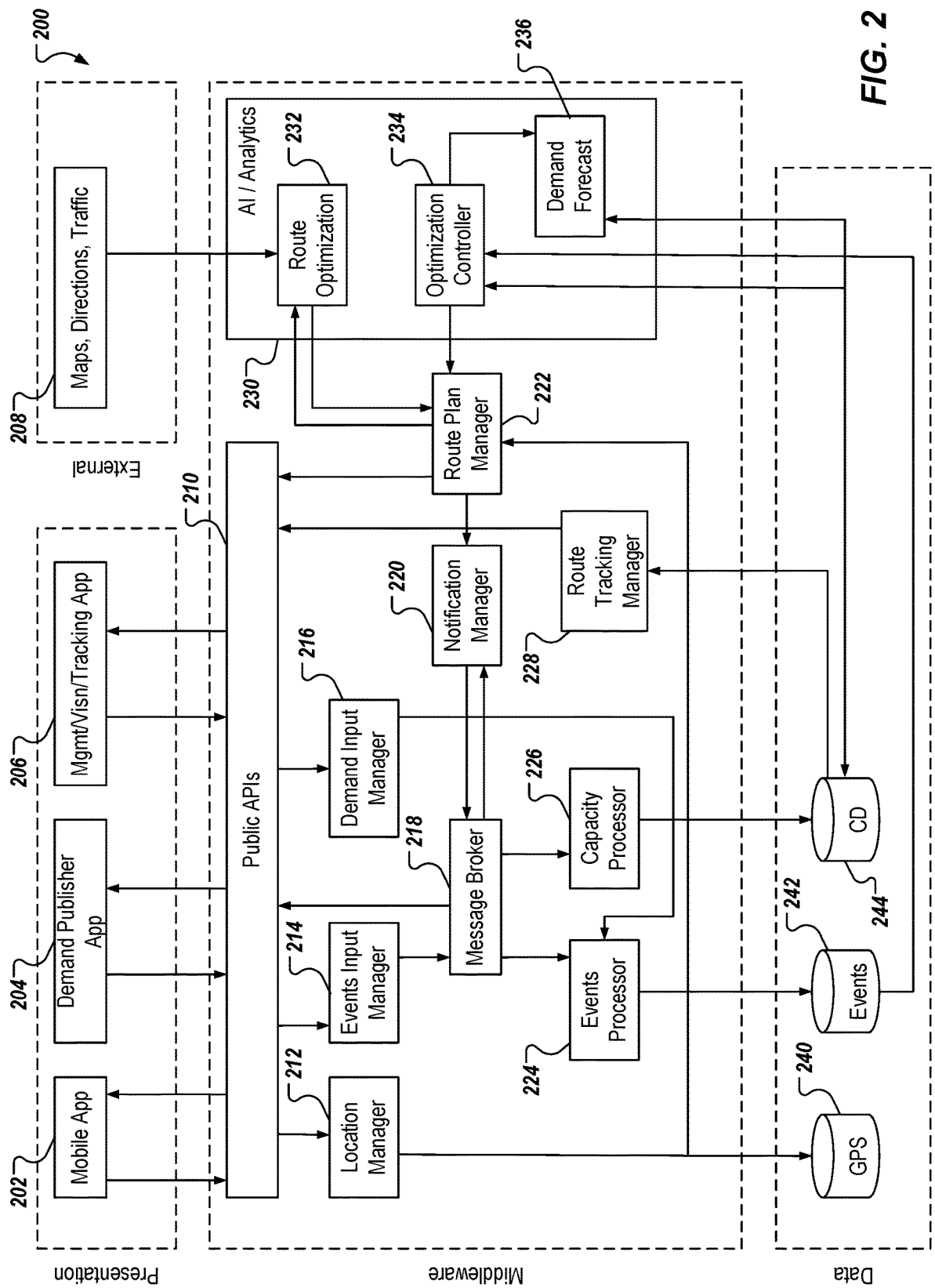
FIG. 2 depicts an example module architecture in accordance with implementations of the present disclosure.

FIG. 2 depicts an example module architecture 200 in accordance with implementations of the present disclosure. The example module architecture 200 of FIG. 2 includes a presentation layer, a middleware layer, and a data layer. The presentation layer includes a mobile application 202, a demand publisher application 204, and a management, visualization, and tracking application 206. The presentation layer also includes external software, such as a mapping, directions, and traffic application 208. In some examples, the external software represents cloud services providing an optional input to the system.

In some implementations, the presentation layer groups the input/output entry points for the applications that integrate with the platform to feed data, retrieve information for visualization, and/or administrate and configure the system. In some examples, the mobile application 202 is executed on a mobile computing device (e.g., of a delivery driver). In some examples, the mobile computing device includes GPS location capabilities. In some examples, the mobile application 202 provides example functionalities including, without limitation, sending location breadcrumbs to the platform (e.g., through a publicly exposed API), receiving route sequences (e.g., through the publicly exposed API), and properly visualize the route, scanning package labels, navigation (e.g., turn by turn through the route sequence received from the platform), and sending statuses (e.g., through the API). Example statuses include, without limitation, package collected, package dropped off, package successfully delivered, delivery failed, package returned.

In some examples, the demand publisher application 204 can be provided as a delivery company (or retailer) application, which publishes delivery requests (e.g., through the API). In some examples, delivery information can include, without limitation, a pickup address, a delivery address, a time window for pickup, a time window for delivery, a service level agreement (SLA), package weight, and package dimensions.

In some examples, the management, visualization, and tracking application 206 is an application for dispatch managers, and administrators to interact with the platform according to enabled functionality through the APIs. Example functionality includes, without limitation, determining drivers location, tracking packages, determining delivery status, route plan assignment for drivers, logging, and monitoring.

The middleware layer includes one or more public APIs 210, a location manager 212, an events manager 214, a demand input manager 216, a message broker 218, a notification manager 220, a route plan manager 222, an events processor 224, a capacity processor 226, a route tracking manager 228, and an artificial intelligence (AI), analytics module 230. In the depicted example, the AI/analytics module 230 includes a route optimization sub-module 232, an optimization controller 234, and a demand forecast sub-module 236.

In some examples, the location manager 212 exposes the API(s) to receive location breadcrumbs, manages concurrent requests, and processes and stores locations received through the API (e.g., from the mobile applications 202). In some examples, the events manager 214 exposes the API(s) to receive delivery events and status changes, manages concurrent requests, processes events received through the API(s), and put it into a system queue (e.g., in the message broker 218). In some examples, the demand input manager 216 exposes the API(s) to receive delivery requests, manages concurrent requests, processes delivery requests for information received through the API(s), stores it in a database, and puts events in the message broker 218 for every delivery request placed.

In some examples, the location manager 212 reads a locations queue from the message broker 218, and processes and stores the locations. In some examples, the events processor 224 reads the events queues from the message broker 218, and processes and stores the events. In some examples, the capacity processor 226 read the events queues from the message broker 218, processes the events, calculates capacity, and updates the database.

In some examples, the notification manager 220 manages subscriptions to notifications in a publisher-subscriber paradigm. That is, one or more components can publish notifications, and one or more components can subscribe to receive notifications. In some examples, the notification manager 220 reads notification messages from the message broker 218, sends notifications to subscribed applications, and places notification acknowledge events into the message broker 218.

In some examples, the route tracking manager 228 reads delivery events and location breadcrumb queues from the message broker 218, calculates route tracking information, manages route tracking subscriptions of applications, and sends and saves route tracking information to subscribed applications.

In some examples, the route plan manager 222 generate delivery status snapshots. In some examples, this can include reading the delivery status and the delivery configuration (e.g., assets, constraints), and aggregating this into a single message item. In some examples, the route plan manager 222 receives route optimization and simulation requests from the optimization controller 234, calls for route optimization (e.g., by the route optimization sub-module 232) using the delivery status snapshot as an input. In some examples, the route planning manager 222 processes the output of the route optimization sub-module 232, stores route plans information into the data layer, and sends route plans to the notification manager 220.

In some examples, the route optimization sub-module 232 receives information about the periodic (e.g., daily) demand, and the demand of previous schedules that is not currently met. In some examples, the optimization controller 234 calls the route plan manager 222 to trigger the route optimisation based on an optimal schedule. In some examples, the demand forecast sub-module 236 provides a demand forecast based on historical data.

The data layer includes a location data database 240, an events data database 242, and a continuous delivery database 244. In some examples, the location data database 240 stores location breadcrumbs sent by the mobile application 202. In some examples, the events data database 242 stores externally and internally generated deliver events. In some examples, the continuous delivery database 244 stores delivery configurations, route plans, optimization controller data, demand information (e.g., actual, forecasted), capacity information, and route tracking information.

In some examples, the external software (also referred to as external services) provide data that is fed into the route optimization. Example external services include, without limitation, maps and distance information, traffic information, weather information, and business rules.

Implementations of the present disclosure are described in further detail herein with reference to the example architectures 100, 200 of FIGS. 1 and 2, respectively.

As introduced above, implementations of the present disclosure provide for route optimization of delivery conveyances. Example conveyances can include, without limitation, cars, trucks, motorcycles, scooters, bicycles, planes, trains, ships, and the like. A conveyance can also include a person (e.g., carrying assets by foot). In some examples, traditional route optimization technologies focus on finding the most efficient route between a series of static nodes, and, in particular between a static origin and static destination nodes. The typical route optimization software is run once in advance of routes being launched.

In accordance with the continuous delivery model of the present disclosure, routes are re-optimized dynamically, and continuously throughout the day. Consequently, implementations of the present disclosure provide route optimization with high throughput. More particularly, the continuous delivery platform of the present disclosure incorporates a complex infrastructure to support the creation of a flexible ecosystem, and enables dynamic origin and dynamic destination pairs. In some examples, route optimization is continuously executed throughout a period (e.g., day) and is driven by advanced analytics (e.g., within the optimization controller 234).

To achieve this, the continuous delivery platform includes route re-optimization during the day, which is triggered by the optimization controller 234, dynamic pick-up locations, predicted origin and destination locations (ghost nodes in the optimization), cross-dock locations for hot or cold-swaps, and truck capacity management to understand available capacity in the delivery ecosystem.

In some implementations, the route optimization determines the most optimum means of fulfilling service demand. Optimization can include optimizing one or more parameters. Example parameters can include, without limitation, cost, traffic, and speed. This can include collection and delivery using the same conveyance, or, orchestrated handover of parcels between conveyances, which can be referred to as cross-docking. Cross-docking generally refers to interactions between, for example, delivery actors, networks, workforces, and/or fleets. In some examples, re-optimization leverages cross-docking to add cross-dock locations (e.g., secure, insecure) within the route optimization constraint model. The cross-dock locations enable collections and deliveries to be made by more than one resource, and for volume to move between networks. In some examples, a cross-dock is a defined location where a parcel swap can take place. This can include hot-swaps (e.g., delivery vehicles meet and directly hand over the parcel directly in the same location and time). This can also include cold-swaps (e.g., a delivery vehicle leaves the parcel in a secure location (locker, post office), and another delivery vehicle comes and collects it at a later point in time).

In some implementations, the demand forecasting sub-module 236 has multiple, primary functions with respect to the continuous delivery platform. Example primary functions include, without limitation, resource planning, triggering optimizations, and predicting delivery/pickup locations. For example, the demand forecasting sub-module 236 performs resource planning of workloads, and conveyance capacities, by forecasting demand volumes in different locations over multiple time horizons. In some examples, the demand forecasting sub-module 236 models relations between locations/areas. As another example, the demand forecasting sub-module 236 provides an input into the optimisation controller to facilitate triggering of optimizations based on expected and observed demands. As another example, the demand forecasting sub-module 236 predict time and locations of likely pickups and deliveries based on historical, and live data to improve dynamic route optimisation.

In some implementations, the demand forecasting sub-module 236 generates predicted pickup and delivery events at spatial locations, and specific time points. In some examples, the demand forecasting sub-module 236 uses historic data (which is continuously updated) to generate predictions of when and where pickups and deliveries are likely to occur. In some examples, the demand forecasting sub-module 236 models output including the likelihood of an event at given location and timepoint, as well as the predicted volume for that location and time.

With regard to resource planning, predictions are used by delivery managers to anticipate likely periods of high or low pickup/delivery volumes at different timepoints and regions. These are used as inputs into the planning process in order to decide on workforce, and network requirements as well as on the positioning of the available workforce, and resources (e.g., conveyances). These can further be used in order to feed into dynamic pricing, as prices react to changes in forecasted supply and demand. In addition, forecasting outputs can be used to model likely truck capacities at different times and location in order to inform carrier performance analytics (CPA), described in further detail herein.

In some implementations, predictions are used as inputs into the optimization controller 234 in order to inform decisions on when to trigger new runs of the route optimization sub-module 232. For example, predictions of sudden changes in demand may inform decisions such as to delay an optimization run, to run optimization earlier than planned, or to trigger optimization immediately.

At a more granular level, model predictions are input to optimization in order to generate routes that are better able to accommodate changes to its location sequence, and pickup/delivery schedule. In some examples, this is achieved by including areas that are likely to contain an event, while the conveyance traverses the route. Events forecasted by the model are provided as inputs into optimization along with the actual pickup/delivery requests, with different levels of priority in the optimization.

In some implementations, the demand forecast sub-module 236 receives records of individual package pickup and deliveries including the exact time of pickup/delivery, as well as the longitude and latitude coordinates of the pickup, and delivery addresses. The demand forecast sub-module 236 aggregates this data across multiple dimensions, for example, spatial and temporal. Different aggregations are performed in order to find the optimal aggregation for the dataset at hand. The raw data is processed taking into account relevant features of the area in question, which could aid the modelling by being represented at a finer scale or at a lower resolution.

In some examples, demand forecast data is fed (e.g., from the continuous delivery database 244) into one or more supervised algorithms, which generates both likelihood of pickup/delivery events at specific locations and times, as well as predicted volumes at those locations and times. The continuous delivery platform incorporates multiple prediction models including, without limitation, deep learning, and statistical-based models. These can be used individually or in combination as an ensemble. An algorithm selector enables selection between a number of models, or to have a model automatically selected based on comparative performance on a development data set. In some examples, the models learn both temporal and spatial patterns, and account for external features (e.g., holidays, retailer sales, demographic information, weather).

In some implementations, one or more thresholds are applied to event predictions so that intensities above a certain cut-off point are deemed highly likely, and are entered into the optimization schedule. These are treated as low-priority orders in the optimization algorithm. In this manner, the optimization algorithm plans routes that go through the predicted area at a given time point, but not at the expense of servicing a real order. If the predicted pickup/delivery does materialize, the deliverer (e.g., driver) will have a minimal disruption to the assigned route. In this manner, the distance traveled is minimized, allowing for more orders to be fulfilled. If the order does not appear, the driver will go directly to the next realised pickup/delivery request.

Figure 3B:
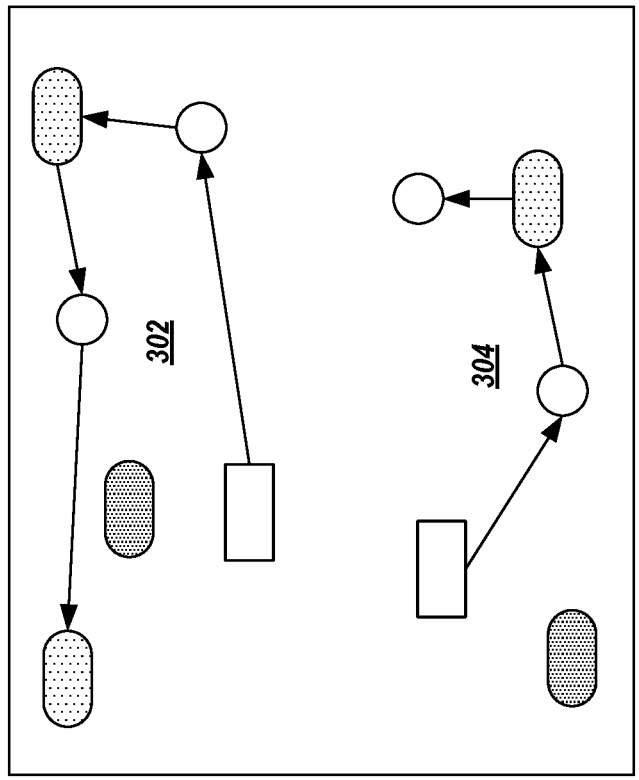
FIGS. 3A and 3B depict an example route optimization in accordance with implementations of the present disclosure.
Figure 3A:
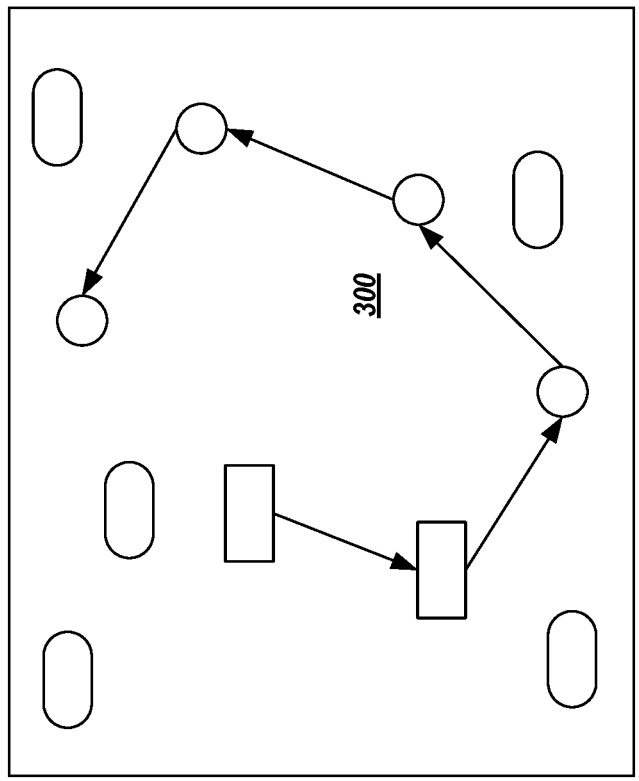

FIGS. 3A and 3B depict an example route optimization in accordance with implementations of the present disclosure. The examples of FIGS. 3A and 3B depicts an example effect of forecasted pickup or delivery events on optimization. FIG. 3A depicts a route 300 generated without taking into account forecasted events. In the depicted examples, rectangles indicate pickups, circles indicate deliveries, and ovals indicate forecasted events. In some examples, light shading indicates realized forecasted events, and dark shading indicates unrealized forecasted events.

FIG. 3A represents when forecasted events are not taken into account. The route 300 is planned in such a way that it may not have capacity to add new orders as it traverses the route. Consequently, packages are delayed due to inefficient re-routing to accommodate the new demand requests, or serviced by a higher cost resource. FIG. 3B represents when forecasted events are taken into account. In the depicted example, the area is split into two routes 302, 304, which can service each demand more efficiently. The routes are planned in such a way as to be able to service the forecasted demands, but noticeably the driver is not actually routed to a forecasted event until it is realized. This prevents drivers from being sent to erroneous stops or waiting for demand to appear.

In some implementations, the demand forecast sub-module 234 is periodically retrained with the latest realized demand data. The most recent data can also be used to make predictions in response to sudden changes in demand. In addition, the incremental learning provides a method to calibrate the forecasting outputs to correct for any systematic errors in the predictions.

In some implementations, the optimization controller 234 is a primary analytical component of the continuous delivery platform. The optimization controller 234 is responsible for finding the best times, along with the last time to trigger a route optimization algorithm during the day to deliver the maximum number of parcels, and at the same time minimize the delivery cost and resources. The optimization controller 234 is time efficient, but also minimizes the disruption on the drivers by updating their routes only when it is necessary.

In some implementations, the optimization controller 234 is provided as an AI system, which utilizes analytics, business, and manual inputs to take the next best decision for triggering. In some examples, analytic inputs include forecasting, time-to-trigger, cut-off, and adaptive learning. In some examples, forecasting includes forecasted demand for different time points during a period (e.g., day). If there is an overlap between the forecasted demand and the actual demand, the materialized and non-materialized demand are considered. In some examples, duplicate records are not taken into consideration by the optimization controller 234. In some examples, business inputs include business rules provided as heuristic rules. Examples can include, without limitation, aggregated driver delay is greater than a threshold, current conveyance capacity is lower than a threshold, traffic conditions exceed a threshold, and weather conditions exceed a threshold. In some examples, manual inputs can include manual rules. For example, an expert system takes a decision to trigger the route optimization algorithm at a certain time during the day.

In some implementations, the optimization controller 234 includes online and offline analytical tasks. In some examples, the online tasks are responsible for the daily operational workflow of parcel delivery, while the offline tasks are responsible for providing analytical inputs that support the decision-making process of the optimization controller.

Figure 4:
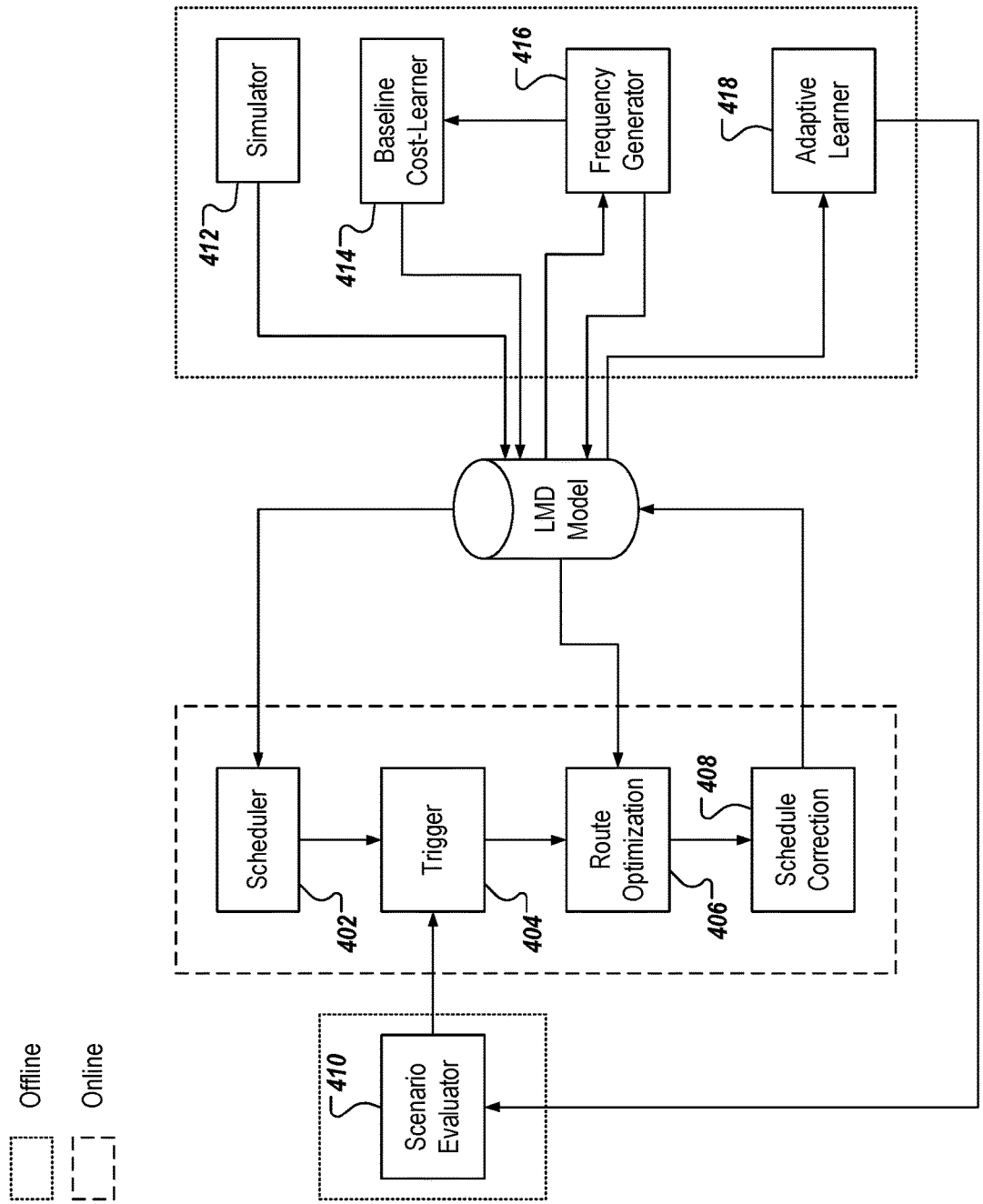
FIG. 4 depicts example online analytical tasks, and example offline analytical tasks in accordance with implementations of the present disclosure.

FIG. 4 depicts example online analytical tasks, and example offline analytical tasks in accordance with implementations of the present disclosure. In some examples, an adaptive scheduler 402 is provided, More particularly, the optimization controller 234 of FIG. 2 generates an optimal baseline "time-to-trigger" and a cut-off threshold based on the available historical information, and a selected time-window (e.g., 3-month historical demand, and cost). In some examples, if the daily demand is significantly different than the historical demand, the adaptive scheduler 402 takes decisions on top of the baseline time-to-trigger. In that case, the cut-off threshold suggests an updated optimal schedule until the next best schedule is selected.

In some examples, a trigger module 404 provides an API call on the route planning manager 222, which provides an API call on the route optimization sub-module 232 of FIG. 2. In this task, the route planning manager 222 prepares inputs from the database model, and converts them into an appropriate format to trigger route optimization. Example inputs include, without limitation, parcel demand, pickup and delivery locations, forecasting predictions, and fleet information. In some examples, the optimization controller 234 is also able to trigger route optimization to impact only a portion of the fleet without updating the entire geography. In some examples, if the optimization controller 234 schedules a triggering at a certain point of time during the day, and the pickup and delivery points are very dense around a specific region, the optimization controller 234 will update the schedules of the fleet on this region only.

In some examples, route optimization 406 receives provides updated routes in response to the trigger issued by the optimization controller 234. In some examples, the updated routes are provided to a schedule correction 408. Because the route optimization needs sufficient amount of time to run and provide new schedules, a process is employed to check whether the conveyances (present in the route optimization inputs, or a subset of the routes) are in the expected location to follow the new updated schedule. In some examples, the schedule correction 408 merges the latest schedule of routes along with the new routes, and uses a logistic tracking system (e.g., GPS locations, delivery status tracking) to project the location of the conveyances. In some examples, the schedule correction 408 sends alerts in case the route optimization 406 cannot generate routing schedules for all of the required demand (given the triggering time and the cut-off threshold). In this case, an overflow fleet can be employed, for example.

In some examples, a scenario evaluator 410 evaluates, in real-time, whether a proposed triggering of the route optimization is better than the baseline solution. This is described in further detail herein with reference to adaptive learning.

In some implementations, a simulator 412 imitates activity of the optimization controller with given values of parameters (e.g., time-to-trigger, cut-off threshold), using the historical data (bounded by a pre-defined historical time window) as input. The main output of the simulator 412 is the value of the objective function (e.g. cumulative cost per number of parcels delivered) associated with the given parameter values. In some examples, when the size of the time window during the simulation is reasonably large (e.g., several months), it becomes infeasible to evaluate the cost of simulations exactly, resulting in a need to use an alternative approach. In view of this, a baseline cost learner 414 predicts the average cost per parcel on a day level, based on the aggregated demand for that day. In some examples, the baseline cost learner 414 is trained on a series of day-level simulations to predict the corresponding average cost per parcel for any combination of predictor variables, for a given combination of the optimisation controller parameters. Example features include, without limitation, time-specific variables to capture the seasonality of the cost distribution (including peak/non-peak period), and variables that capture the distribution of the demand and the cost distribution. In this manner, the performed simulations can be used as a training set to obtain predictions for a wider range of variable values, thus providing an estimate for the simulated cost for a given time window.

In some implementations, a frequency generator 416 is provided, and determines optimal optimization controller parameters. The optimization controller parameters include re-optimisation time-to-trigger, and cut-off threshold. By determining optimal parameters a minimal value of an objective function (e.g., cumulative cost per average number of packages delivered over a given time window) is provided. For each of the parameter values, the frequency generator 416 is initialized by evaluating the objective at several pre-defined points (e.g. uniformly spread across the domain of the objective).

This is followed by executing the route optimization 406 (offline), which, at each iteration, proposes a set of parameter values to be evaluated. In some examples, the set of parameter values is based on the current values of the optimization controller parameters, and corresponding values of the objective function. In some examples, each evaluation of the objective function comes from a series of simulations augmented with predictions from the baseline cost learner 414. The optimal parameter values are passed to the scheduler 402 to construct the corresponding schedule. In some examples, re-triggering of route optimization occurs from the start of the day until the cut-off threshold time with uniform intervals, where the size of the interval is determined by the time-to-trigger.

In some implementations, an adaptive learner 418 is provided, and adjusts the re-triggering strategy based on the live performance of the optimisation controller 234, rather than re-triggering route optimization with a pre-defined time-to-trigger. For example, during a given period (e.g., day), after a triggering of route optimization, the output from the demand forecast sub-module 236 is passed to the adaptive learner 418, and a series of simulations are performed to obtain the best time for the next optimization execution. In order to find an optimal schedule, the time until the next optimization run may be used as a parameter for the model similar to the one used in the time to trigger/cut-off generator (the frequency generator 416). Each option for re-optimization time has a cumulative cost per parcel associated with it, which represents the objective that is to be minimised.

In some implementations, the continuous delivery platform includes varying inputs in time and space. In some implementations, incremental learning is employed on these inputs to ensure that the time-to-trigger, and cut-off will be defined based on the most representative/updated distribution of the input data. In some examples, the baseline cost learner 414, and the adaptive learner 418 are updated based on historical information. In some examples, the historical information is generated from simulations, and/or from daily operation of the same day delivery solution. The update can be implemented periodically using a schedule module, or can be implemented using a self-learning module where updates are performed when the error between the actual cost versus the predicted cost is increasing (e.g., at a threshold rate).

In some examples, incremental learning occurs for the forecasting module and forecasting outputs in multiple ways. In a first example, the model can be updated as new data points are realised. In the first example, the model is updated by retraining on the latest data set available. Depending on the model, this involves retraining on the full dataset, or sequentially updating the model using only the latest data points. In a second example, outputs of the model are calibrated to account for regular discrepancies between predicted events and volume, and the realised volume. In the second example, calibration techniques are used to account for consistent discrepancies between model predictions, and realised outcomes. The calibrations are dynamic in that they can incorporate external features such as weather, time of week/year, public holidays, to apply different levels of calibration depending on the events that are occurring. In this manner, the continuous delivery platform responds to actual changes in demand or circumstances.

In some implementations, an insight studio can be provided, which provides feedback from the analytics modules and acquired data to users of the system. In this manner, the insight studio can reveal insights and inform data-driven decision making. In some examples, the insight studio can provide data summaries to reveal for example areas of high demand, areas more susceptible to delays, carrier performance, and the like. In some examples, the insight studio can yield insight into the performance of the analytics components, such as forecasting accuracy, the optimization controller outputs relative to simulated outputs, or discrepancies between outputs of the optimization and realised outcomes. More generally, the insight studio can give insights into regions where the continuous delivery platform is more viable and effective, and also to identify and create business rules which inform the acceptance of orders, different service level offerings and agreements.

In some implementations, a CPA tool is provided to analyse performance of one or more carriers. In some examples, the CPA tool includes a number of core capabilities to measure the performance of a carrier on an individual and collective basis. In this manner, the CPA tool enables informed decision making and management of information for subsequent reporting. In some examples, the CPA tool includes capacity tracking functionality, which can include monitoring and management of available capacity in an individual carrier and the fleet as a whole. This enables better supply forecasting and improved capacity maximization. In some examples, the CPA tool includes business feasibility control functionality, which employs analytics to calculate each parcel's individual price, and identifies characteristics of profitable or non-profitable orders. In this manner, future orders can be made in a manner that meets SLAs/cost requirements. Application of this knowledge to inform optimization and scheduling can improve efficiency, and cost-effective delivery. This also enables the creation of dynamic pricing to retailers.

With regard to dynamic pricing, implementations of the present disclosure provide an analytics module that combines the historical and predicted cost for a given package with the knowledge of the current delivery ecosystem to understand where efficiencies and package consolidation opportunities exist. This can be passed on to retailers in the form of dynamic pricing to a consumer (e.g. a delivery promotion to an end customer in the event that a delivery conveyance is likely to be near their location during the day).

In some implementations, a retailer pricing and consolidation API is provided. In some examples, this API can be used by retailers to access to dynamic pricing information and pass this on through to their customers as delivery promotions. In some examples, this API can be used to provide recommendations for the consolidation of deliveries between/across carriers to increase demand density, and drive further efficiency savings.

Figure 5:
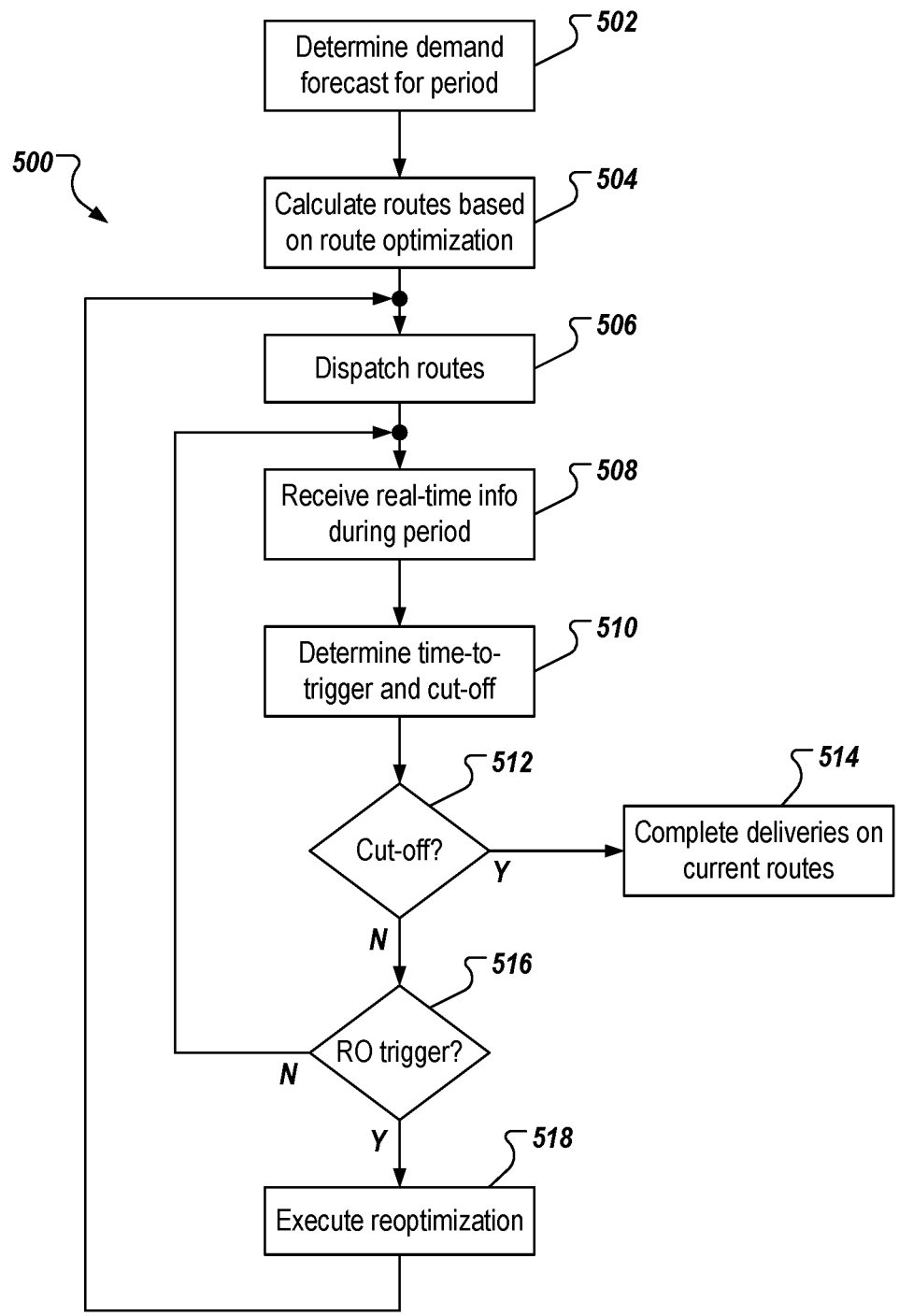
FIG. 5 depicts an example process that can be executed in implementations of the present disclosure.

FIG. 5 depicts an example process 500 that can be executed in implementations of the present disclosure. In some examples, the example process 500 is provided using one or more computer-executable programs executed by one or more computing devices.

A demand forecast is determined for a period (502). For example, and as described herein, the demand forecast sub-module 236 receives historical data for prior periods, and delivery information for a current period to determine a predicted demand data. In some examples, a period is a day. In some examples, the historical data includes deliveries performed in one or more periods prior to the current period. In some examples, the delivery information for the current period includes already received delivery requests, pick-up times, delivery times, pick-up locations, delivery locations, and the like. In some examples, the predicted demand includes expected collection and delivery locations, expected collection and delivery times, and volumes (e.g., number of assets to be delivered). A set of routes are calculated based on route optimization (504). For example, and as described herein, the optimization controller 234 triggers the route optimization sub-module 232 to determine an optimized set of routes based on the predicted demand data. In some examples, the optimized set of routes includes routes between dynamic nodes, as well as additional nodes not yet included in a route, but expected to be included in a subsequent route. The set of routes is dispatched (506). For example, routes in the set of routes are conveyed to delivery personnel (e.g., couriers, drivers). In some examples, a route is transmitted to the mobile application 202 executed on a respective computing device of a delivery person. In some examples, the demand forecast through dispatch of the set of routes are performed in a preparatory stage, prior to beginning of the period.

Real-time information is received during the period (508). For example, and as described herein, data can be provided in real-time as it is generated. Example data can include, without limitation, location data of delivery conveyances (e.g., GPS data from computing devices carried by delivery personnel), vehicle data (e.g., speed, direction), delivery data (e.g., pickup/drop-off status), and new delivery data (e.g., new orders placed during the period requiring pickup/drop-off). In some examples, the data can also include previous optimization data (e.g., parameters used for one or more previous iterations of route optimization, if any). In some examples, the optimization controller 234 receives the data. In some examples, forecast data is also received. For example, the optimization controller 234 receives forecast data from the forecast demand sub-module 236.

One or more of a time-to-trigger, and a cut-off are determined (510). For example, and as described herein, the frequency generator 416 of FIG. 4 determines optimal optimization controller parameters based on the real-time data, and the forecast data, the optimization controller parameters including the time-to-trigger, and the cut-off threshold. As also described herein incremental learning is employed on inputs to ensure that the time-to-trigger, and cut-off are determined based on the most representative/updated distribution of the data.

It is determined whether the cut-off is achieved (512). For example, it can be determined whether a current time equals, or exceeds the cut-off. In some examples, if the current time equals, or exceeds the cut-off, it is determined that the cut-off is achieved. Consequently, deliveries for the remainder of the period are executed using the current routes. That is, no further route optimization is performed for the current period. If the cut-off has not been achieved, it is determined whether the time-to-trigger has been achieved (516). For example, it is determined whether the current time is equal to, or exceeds the time-to-trigger since the previous route optimization. If the time-to-trigger has not been achieved, the example process 500 loops back to continue monitoring of the delivery operations based on the current routes. If the time-to-trigger has been achieved, route re-optimization is executed to determine a revised set of routes. In some examples, the revised set of routes includes one or more modified routes, and/or one or more new routes. In some examples, the revised set of routes includes at least one route included in the set of routes. The example process 500 loops back to dispatch routes in the revised set of routes.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method executed by one or more processors for selective optimization of delivery routes using a continuous delivery platform, the method comprising:
   determining a set of routes for delivery of assets within a delivery network based on demand forecast and realized demand for a period, the demand forecast being indicative of prediction of demand for delivery of assets within the period;
   during at least partial execution of the set of routes, receiving real-time data representative of delivery of assets, and updated demand forecast;
   determining, by an optimization controller of the continuous delivery platform, one or more of a time-to-trigger, and a cut-off time at least partially based on the real-time data, and the updated demand forecast, the time-to-trigger defining an interval, at which the set of routes for delivery of assets is to be reoptimized;
   in response to the time-to-trigger being achieved, re-optimizing, by a route optimization module of the continuous delivery platform, the set of routes to provide a revised set of routes; and
   conveying at least one route of the revised set of routes to a delivery personnel, the at least one route being different from any route in the set of routes, and being executed during the period.

2. The method of claim 1, wherein routes are defined as a plurality of dynamic nodes, at least one node changing between a route in the set of routes, and a route in the revised set of routes.

3. The method of claim 1, wherein the time-to-trigger is intermittently updated during the period, and at least one subsequent re-optimization of routes is executed based on an updated time-to-trigger.

4. The method of claim 1, wherein the time-to-trigger is at least partially determined by on incremental learning based on the demand forecast, and actual conditions within the delivery network.

5. The method of claim 4, wherein the incremental learning at least partially comprises one of retraining a predictive model based on a most-recent dataset available, and retraining the predictive model based on a full dataset including historical data, and the most-recent dataset.

6. The method of claim 1, wherein at least a portion of the real-time data is received from a mobile computing device of the deliver personnel, and the at least one route of the revised set of routes is conveyed to the mobile computing device.

7. The method of claim 1, wherein the cut-off time defines a time during the period, after which re-optimization of the routes is not executed.

8. The method of claim 1, wherein the at least one route comprises one of a new route, and a modified route.

9. The method of claim 1, wherein the set of routes is determined based on historical asset demand data.

10. The method of claim 1, wherein determining the set of routes includes predicting one or more route destinations.

11. The method of claim 1, wherein the real-time data is representative of a location of a delivery vehicle and/or of a location of an asset.

12. The method of claim 1, further comprising optimizing a time for delivery of an asset on one or more routes of the set of routes.

13. A non-transitory computer-readable storage medium coupled to one or more processors and having instructions stored thereon which, when executed by the one or more processors, cause the one or more processors to perform operations for selective optimization of delivery routes using a continuous delivery platform, the operations comprising:
   determining a set of routes for delivery of assets within a delivery network based on demand forecast and realized demand for a period, the demand forecast being indicative of prediction of demand for delivery of assets within the period;
   during at least partial execution of the set of routes, receiving real-time data representative of delivery of assets, and updated demand forecast;
   determining, by an optimization controller of the continuous delivery platform, one or more of a time-to-trigger, and a cut-off time at least partially based on the real-time data, and the updated demand forecast, the time-to-trigger defining an interval, at which the set of routes for delivery of assets is to be reoptimized;
   in response to the time-to-trigger being achieved, re-optimizing, by a route optimization module of the continuous delivery platform, the set of routes to provide a revised set of routes; and
   conveying at least one route of the revised set of routes to a delivery personnel, the at least one route being different from any route in the set of routes, and being executed during the period.

14. The computer-readable storage medium of claim 13, wherein routes are defined as a plurality of dynamic nodes, at least one node changing between a route in the set of routes, and a route in the revised set of routes.

15. The computer-readable storage medium of claim 13, wherein the time-to-trigger is intermittently updated during the period, and at least one subsequent re-optimization of routes is executed based on an updated time-to-trigger.

16. The computer-readable storage medium of claim 13, wherein the time-to-trigger is at least partially determined by on incremental learning based on the demand forecast, and actual conditions within the delivery network.

17. The computer-readable storage medium of claim 16, wherein the incremental learning at least partially comprises one of retraining a predictive model based on a most-recent dataset available, and retraining the predictive model based on a full dataset including historical data, and the most-recent dataset.

18. The computer-readable storage medium of claim 13, wherein at least a portion of the real-time data is received from a mobile computing device of the deliver personnel, and the at least one route of the revised set of routes is conveyed to the mobile computing device.

19. The computer-readable storage medium of claim 13, wherein the cut-off time defines a time during the period, after which re-optimization of the routes is not executed.

20. The computer-readable storage medium of claim 13, wherein the at least one route comprises one of a new route, and a modified route.

21. The computer-readable storage medium of claim 13, wherein the set of routes is determined based on historical asset demand data.

22. The computer-readable storage medium of claim 13, wherein determining the set of routes includes predicting one or more route destinations.

23. The computer-readable storage medium of claim 13, wherein the real-time data is representative of a location of a delivery vehicle and/or of a location of an asset.

24. The computer-readable storage medium of claim 13, wherein operations further comprise optimizing a time for delivery of an asset on one or more routes of the set of routes.

25. A system, comprising:
one or more processors; and
a computer-readable storage device coupled to the one or more processors and having instructions stored thereon which, when executed by the one or more processors, cause the one or more processors to perform operations for selective optimization of delivery routes using a continuous delivery platform, the operations comprising:
- determining a set of routes for delivery of assets within a delivery network based on demand forecast and realized demand for a period, the demand forecast being indicative of prediction of demand for delivery of assets within the period;
- during at least partial execution of the set of routes, receiving real-time data representative of delivery of assets, and updated demand forecast;
- determining, by an optimization controller of the continuous delivery platform, one or more of a time-to-trigger, and a cut-off time at least partially based on the real-time data, and the updated demand forecast, the time-to-trigger defining an interval, at which the set of routes for delivery of assets is to be reoptimized;
- in response to the time-to-trigger being achieved, re-optimizing, by a route optimization module of the continuous delivery platform, the set of routes to provide a revised set of routes; and
- conveying at least one route of the revised set of routes to a delivery personnel, the at least one route being different from any route in the set of routes, and being executed during the period.

26. The system of claim 25, wherein routes are defined as a plurality of dynamic nodes, at least one node changing between a route in the set of routes, and a route in the revised set of routes.

27. The system of claim 25, wherein the time-to-trigger is intermittently updated during the period, and at least one subsequent re-optimization of routes is executed based on an updated time-to-trigger.

28. The system of claim 25, wherein the time-to-trigger is at least partially determined by on incremental learning based on the demand forecast, and actual conditions within the delivery network.

29. The system of claim 28, wherein the incremental learning at least partially comprises one of retraining a predictive model based on a most-recent dataset available, and retraining the predictive model based on a full dataset including historical data, and the most-recent dataset.

30. The system of claim 25, wherein at least a portion of the real-time data is received from a mobile computing device of the deliver personnel, and the at least one route of the revised set of routes is conveyed to the mobile computing device.

31. The system of claim 25, wherein the cut-off time defines a time during the period, after which re-optimization of the routes is not executed.

32. The system of claim 25, wherein the at least one route comprises one of a new route, and a modified route.

33. The system of claim 25, wherein the set of routes is determined based on historical asset demand data.

34. The system of claim 25, wherein determining the set of routes includes predicting one or more route destinations.

35. The system of claim 25, wherein the real-time data is representative of a location of a delivery vehicle and/or of a location of an asset.

36. The system of claim 25, wherein operations further comprise optimizing a time for delivery of an asset on one or more routes of the set of routes.

* * * * *